(12) United States Patent
Smeeton et al.

(10) Patent No.: US 12,504,713 B2
(45) Date of Patent: Dec. 23, 2025

(54) LIGHT DETECTION AND RANGING

(71) Applicant: Envisics Ltd, Milton Keynes (GB)

(72) Inventors: Timothy Smeeton, Milton Keynes (GB); Konstantinos Papadimitriou, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 410 days.

(21) Appl. No.: 18/005,460

(22) PCT Filed: Jul. 13, 2021

(86) PCT No.: PCT/EP2021/069401
§ 371 (c)(1),
(2) Date: Jan. 13, 2023

(87) PCT Pub. No.: WO2022/028819
PCT Pub. Date: Feb. 10, 2022

(65) Prior Publication Data
US 2023/0280691 A1 Sep. 7, 2023

(30) Foreign Application Priority Data
Aug. 5, 2020 (GB) ..................................... 2012149

(51) Int. Cl.
*G03H 1/00* (2006.01)
*G01S 7/481* (2006.01)
(Continued)

(52) U.S. Cl.
CPC ......... *G03H 1/0005* (2013.01); *G01S 7/4814* (2013.01); *G01S 7/4817* (2013.01);
(Continued)

(58) Field of Classification Search
CPC ... G03H 1/0005; G01S 17/931; G01S 7/4814; G01S 7/4817; G01S 7/4873; G01S 7/10; G01S 7/89
(Continued)

(56) References Cited

U.S. PATENT DOCUMENTS

2019/0353759 A1* 11/2019 Christmas ............. G01S 7/4817
2020/0103500 A1* 4/2020 Shand ..................... G01S 17/10

FOREIGN PATENT DOCUMENTS

GB 2560490 A 9/2019

OTHER PUBLICATIONS

Combined Search and Examiner Report for GB2012149.7, Dated Feb. 28, 2022.
(Continued)

*Primary Examiner* — Stephone B Allen
*Assistant Examiner* — Boutsikaris Leonidas
(74) *Attorney, Agent, or Firm* — Akerman LLP

(57) ABSTRACT

A method of light detection and ranging comprises a displaying a first hologram of a first light pattern on a first array of light-modulating pixels and illuminating the first hologram with first pulsed light in order to project the first light pattern onto the scene. The method comprises a displaying a second hologram of a second light pattern on a second array of light-modulating pixels and illuminating the second hologram with second pulsed light in order to project the second light pattern onto the scene. At least one pulse property of the first pulsed light is different to that of the second pulsed light.

20 Claims, 12 Drawing Sheets

(51) Int. Cl.
    *G01S 7/487*     (2006.01)
    *G01S 17/10*     (2020.01)
    *G01S 17/89*     (2020.01)
    *G01S 17/931*     (2020.01)

(52) U.S. Cl.
    CPC ............ *G01S 7/4873* (2013.01); *G01S 17/10* (2013.01); *G01S 17/89* (2013.01); *G01S 17/931* (2020.01)

(58) Field of Classification Search
    USPC .......................................................... 359/1
    See application file for complete search history.

(56) References Cited

OTHER PUBLICATIONS

Search Report and Written Opinion for PCT/EP2021/069401, Dated Oct. 25, 2021.

\* cited by examiner

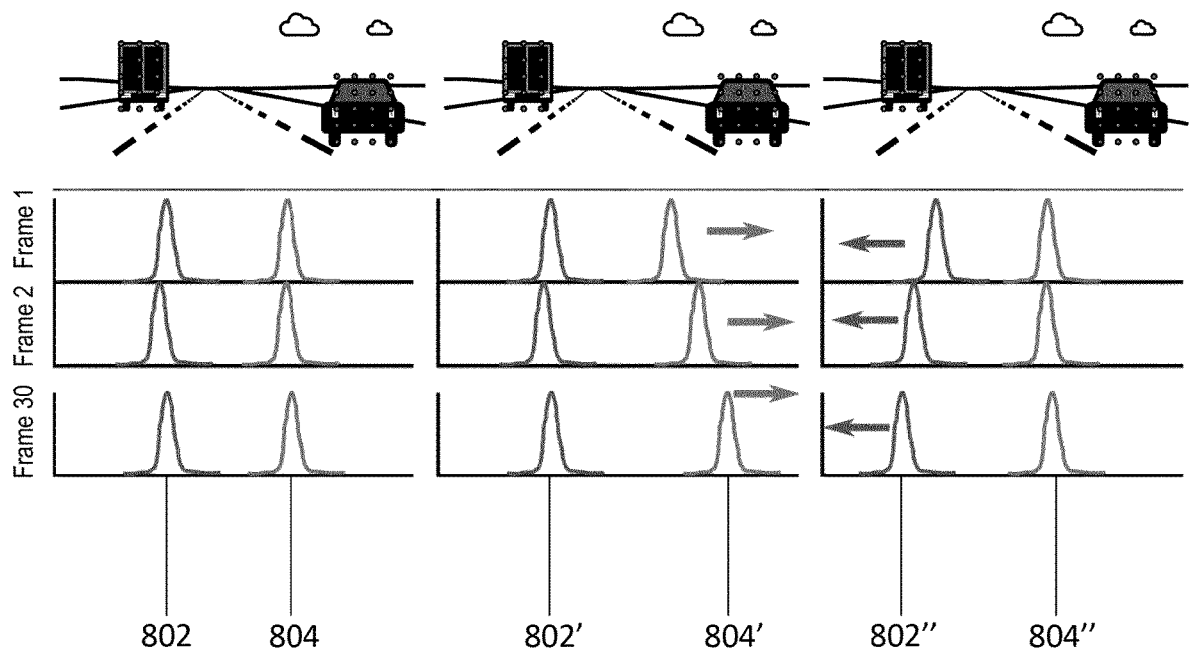

ND RANGING

RELATED APPLICATIONS

This application claims the benefit under 35 U.S.C. § 371 of the filing date of International Patent Application No. PCT/EP2021/069401, having an international filing date of Jul. 13, 2021, which claims priority to United Kingdom Application No. 2012149.7, filed Aug. 5, 2020, the contents of both of which are incorporated herein by reference in their entirety.

FIELD

The present disclosure relates to a holographic projector for projecting light patterns. The present disclosure also relates to light detection and ranging, "LIDAR". Some embodiments relate to a method of optimising the light pattern for LIDAR. Other embodiments relate to a LIDAR system comprising a holographic projector of light patterns and a detector array.

BACKGROUND AND INTRODUCTION

Light scattered from an object contains both amplitude and phase information. This amplitude and phase information can be captured on a photosensitive plate or film using an interference technique called holography. The pattern captured on the photosensitive plate or film is referred to as a holographic recording or hologram. The hologram may be used to form a reconstruction of the object. The reconstruction of the object formed by the hologram is referred to as a holographic reconstruction. The holographic reconstruction may be formed by illuminating the hologram with suitable light.

Computer-generated holography may numerically simulate the processes used to form a hologram by interference of light. A computer-generated hologram may be calculated using a mathematical transformation. The mathematical transform may be based on a Fourier transform. The mathematical transform may be a Fourier transform or Fresnel transform. A hologram calculated by performing a Fourier transform of a target image may be referred to as a Fourier transform hologram or Fourier hologram. A Fourier hologram may be considered a Fourier domain, or frequency domain, representation of the target image. A hologram calculated using a Fresnel transform may be referred to as a Fresnel hologram.

A computer-generated hologram may comprise an array of hologram values which may be referred to as hologram pixels. Each hologram value may be a phase and/or amplitude value. Each hologram value may be constrained—e.g. quantised—to one of a plurality of allowable values. A computer-generated hologram may be displayed on a display device. The choice of allowable values may be based on the display device which will be used to display the hologram. The plurality of allowable values may be based on the capabilities of the display device.

The display device may be a spatial light modulator comprising an array of pixels. The spatial light modulator may be a liquid crystal device in which case each pixel is an individually-addressable liquid crystal cell having birefringence. Each pixel may modulate the amplitude and/or phase of light in accordance with a corresponding hologram pixel. Each pixel comprises a light-modulating element and a pixel circuit arranged to drive the light-modulating element. The hologram may be considered a light modulation pattern.

A holographic reconstruction may be formed by illuminating the displayed hologram with suitable light. The amplitude and/or phase of incident light is spatially modulated in accordance with the light modulation pattern. The light is diffracted by the spatial light modulator. The complex light pattern emanating from the display device interferes at a replay plane to form a holographic reconstruction corresponding to the target image. If the hologram is a Fourier hologram, the replay plane is in the far-field (i.e. an infinite distance from the display device) but a lens may be used to bring the replay plane into the near-field. For convenience, the holographic reconstruction itself may be referred to as an image. The holographic reconstruction is projected onto a plane away from the display device and the technique is therefore known as holographic projection. The image projected in accordance with this disclosure is referred to as a light pattern.

LiDAR light sources typically utilise optical pulses of fixed pulse duration and repetition frequency. Constantly emitting optical pulses of specific pulse duration and repetition frequency means sacrificing either depth resolution for near objects or optical power for far objects. When a vehicle is moving fast, it is more important to know whether an object appears suddenly in front of the car in the far field (without high depth resolution), while when the vehicle is moving slowly the near field may be more important and might require higher depth resolution for the each object of the scene.

A light detection and ranging system may be formed using a holographic projector to project dynamically-reconfiguration light patterns onto objects in a scene. There is disclosed herein a method of optimising the holographic light pattern for light detection and ranging.

SUMMARY

There is disclosed herein a method of light detection and ranging. The method comprises a first step of displaying a first hologram of a first light pattern on a first array of light-modulating pixels and illuminating the first hologram with first pulsed light in order to project the first light pattern onto the scene. The method comprises a second step of displaying a second hologram of a second light pattern on a second array of light-modulating pixels and illuminating the second hologram with second pulsed light in order to project the second light pattern onto the scene. At least one pulse property of the first pulsed light is different to that of the second pulsed light.

In some embodiments, the at least one pulse property is at least one selected from the group comprising pulse width/duration, peak power or pulse repetition rate (i.e. the time interval between successive pulses). In some embodiments, the at least one pulse property is a time or temporal dimension of the pulsed light such as pulse duration or pulse repetition rate.

In some embodiments, the second step is performed after the first step. For example, the first step may correspond to a first frame and the second step may correspond to the next frame in time. In other embodiments, the first step and second step are performed at substantially the same time. In some embodiments, the at least one pulse property is a function of range, wherein range is the distance—e.g. perpendicular distance—from the light detection and ranging device to a plane of interest in the scene—e.g. the plane containing an object of interest. The reader will be familiar with the idea that the method may comprises probing or interrogating a plurality of different planes—e.g. one at a time—in the scene by dynamic adjustment of the device—e.g. dynamic adjustment to the focal length of a software lens function combined with the hologram of the light pattern. The reader will also be familiar with the idea that the light pattern may be optimized for a particular plane—e.g. the system may be arranged such that the light pattern is focused on the plane of interest.

A feature of holographic projection is that the intensity of the image formed on the holographic replay plane by the hologram is a function of the amount of image content. This is because the hologram is a diffractive pattern that redistributes light. The more areas of the replay plane that receive light, the lower the brightness of each area receiving light. In other words, the number of image pixels of the holographic replay field that are switched "on" (i.e. receive light from the hologram) determines the brightness of each "on" image pixel. For example, the brightness of each image spot of a hologram forming two image spots is greater than the brightness of each image spot of a hologram forming three image spots. This is not true in conventional display in which an image, not a hologram of an image, is displayed on the display device.

The applicant has previously disclosed a light detection and ranging, "LIDAR", system using a holographic projector as the light source. The holographic projector may be configured to project an array of light spots into the scene in order to obtain an array of time-of-flight measurements using a detector array comprising a plurality of individual light detecting elements. There may or may not be one-to-one correlation between the holographically-formed light spots and the individual light detecting elements. The inventors have found that the brightness of each light spot of the array of light spots projected onto an object in the scene is crucial to obtaining good point cloud data from the detector.

The second light pattern may be projected onto the scene after the first light pattern. These embodiments allow the device to adapt the light pattern in time—for example, based on an output or result associated with the first light pattern or another dynamic parameter associated with the method. The method may comprise dynamically changing a temporal dimension of the light pattern—e.g the next light pattern in a sequence of light patterns—in response to an input or control signal, optionally, based on a real-time measurement. The first light pattern and second light pattern may be successive light patterns of a plurality of light patterns projected onto the scene in accordance with a plurality or sequence of projection events—e.g. using pulsed or gated light. The second light pattern may be the light pattern immediately after the first light pattern in the sequence.

The at least one pulse property may be at least one selected from the group comprising: pulse duration, peak power and repetition rate.

The at least one pulse property of the first pulsed light may be based on a first parameter and the at least one pulse property of the second pulsed light may be based on a second parameter. The first/second parameter may be external parameters received by the LIDAR system. The first/second parameter may relate to the operating state of a vehicle or may be a user input or may be calculated based on prior determinations by the LIDAR system.

The method may therefore further comprise receiving a first parameter associated with projection of the first light pattern and a second parameter associated with projection of the second light pattern. The method may also comprise determining the at least one pulse property of the second pulsed light based on the difference between the first parameter and the second parameter and, optionally, the at least one pulse property of the first pulsed light. For example, the method may comprise determining what change to make to the at least one pulse property of the first pulsed light in order to determine the at least one pulse property required for the second pulsed light. That determination may be based on the change to the parameter—i.e. the difference between the first parameter and second parameter. The term "associated with projection" is used to reflect that there is a time correspondence between the value of the parameter and projection of the corresponding light pattern. For example, the nth parameter is the value of the parameter at substantially the time of projection of the nth light pattern. The person skilled in the art will appreciate that, in practice, the nth parameter may be determined just before illumination of the corresponding nth hologram or even determination, selection or calculation of the nth hologram.

The magnitude of the difference between the at least one pulse property of the first pulsed light and that of the second pulsed light may be based on a difference between a first range associated with projection of the first light pattern and a second range associated with the second light pattern. A range resolution may be associated with each range. The range resolution is a measure of the smallest difference in distance or time of flight that the system can resolve at any particular range. The magnitude of the difference between the at least one pulse property of the first pulsed light and that of the second pulsed light may be based on a difference between a first range resolution associated with projection of the first light pattern and a second range resolution associated with the second light pattern.

The method of the present disclosure may comprise dynamically changing the range and, optionally, range resolution. Each illumination event therefore has a corresponding range and range resolution. Each light pattern may or may not be uniquely associated with a range. The method may further comprise selecting the light pattern based on range. The person skilled in the art will appreciate that other factors (such as measurements associated with a prior scan) may influence the selection of light pattern.

In general terms, the first/second parameter may be a first/second measured value or a first/second input. The first/second input may be a first/second input from a sensor or a user. The first range or first range resolution may correspond to a first speed. The second range or second range resolution may correspond to a second speed. The first/second speed may be a speed of a vehicle performing the method of light detection and ranging. The first/second speed may be a speed of an object or vehicle in the scene which is the target of the method of light detection and ranging. In either case, the method may comprise receiving or measuring a parameter—e.g. speed of a vehicle—and determining the range based on the received or measured parameter.

In some embodiments, a change to a parameter associated with the method determines a change in range (e.g. required range or optimal range) which, in turn, determines a change in the light pattern (e.g. spot density) and a corresponding change in the at least one pulse parameter (e.g. pulse repetition rate). In accordance with this method, light detection and ranging is improved, optionally, in response to an external parameter.

In general terms. the range and range resolution required depend on a parameter or characteristic of the vehicle and/or road situation. For example, higher vehicle speed requires higher range and, in this case, range resolution or range precision may be sacrificed to enable the higher range.

The method may be performed by a vehicle and the magnitude of the difference between the at least one pulse property of the first pulsed light and that of the second pulsed light may be based on a measured change in the speed of the vehicle after projection of the first light pattern. The inventors have recognized that characteristics of the light pattern can be optimized for vehicle speed. The inventors have appreciated that at high speed, distant objects immediately in front may be more significant than near objects to the periphery/sides, and vice versa. For example, when a vehicle is moving fast, it is more important to know whether an object might appear suddenly in front of the car in the far field (without high range resolution), while when the vehicle is moving slowly the near field may be more important and might require higher range resolution of the each object of the scene.

The at least one pulse property may comprise pulse duration and the method may comprise selecting (e.g. modulating) the pulse duration of the second pulsed light to be greater than that of the first pulsed light if the measured change in the speed of the vehicle indicates that the speed of the vehicle has increased. Likewise, the method may comprise selecting (e.g. modulating) the pulse duration of the second pulsed light to be less than that of the first pulsed light if the measured change in the speed of the vehicle indicates that the speed of the vehicle has decreased.

The at least one pulse property may additionally or alternatively comprise peak power and the method may comprise selecting the peak power of the second pulsed light to be greater than that of the first pulsed light if the measured change in the speed of the vehicle indicates that the speed of the vehicle has increased. Likewise, the method may comprise selecting the peak power of the second pulsed light to be less than that of the first pulsed light if the measured change in the speed of the vehicle indicates that the speed of the vehicle has decreased. The increase in peak power in these circumstances may be associated with an increase in range.

The at least one pulse property may additionally or alternatively comprise repetition rate and the method may comprise selecting the repetition rate of the second pulsed light to be greater than that of the first pulsed light if the measured change in the speed of the vehicle indicates that the speed of the vehicle has decreased. Likewise, the method may comprise selecting the repetition rate of the second pulsed light to be less than that of the first pulsed light if the measured change in the speed of the vehicle indicates that the speed of the vehicle has increased. This feature addresses the problem of so-called "wraparound" ambiguity in which light returned from reflection of a distant object by a first laser pulse is misinterpreted as reflection from a closer object of light from a subsequent laser pulse.

The method may comprise selecting the second hologram so that size of the second light pattern projected onto the scene in the horizontal direction is less than that of the first light pattern if the measured change in the speed of the vehicle indicates that the speed of the vehicle has increased. Likewise, the method may comprise selecting the second hologram so that size of the second light pattern projected onto the scene in the horizontal direction is greater than that of the first light pattern if the measured change in the speed of the vehicle indicates that the speed of the vehicle has decreased. This feature provides the technical advancement of improved energy efficiency. For example, scanning the whole scene irrespective of vehicle's speed means that resources are wasted on regions of the scene that are not necessarily useful (e.g. side parts of the scene, outside the road), which translates into optical power waste and additional processing time from data that is not really needed.

The first light pattern and second light pattern may comprise an array of light spots having common periodicity such that the second light pattern comprises fewer light spots in the horizontal direction than the first light pattern. At high speed the edges of the scene are not that critical. In a holographic system, this feature provides the technical advancement increases the power of the light spots in the central region because the intensity of each light spot of an array of light spots formed by holographic reconstruction is dependent on the number of light spots in the replay field. The inventors have identified this natural synergy between holography and automotive LIDAR and provided a method that exploits this synergy.

The method may further comprise detecting a first light return corresponding to projection of the first light pattern onto the scene and making a measurement (e.g. assessment of the scene) associated with the first light return, wherein the magnitude of the difference between the at least one property of the first pulsed light and that of the second pulsed light is determined by the measurement associated with the first light return. This method is directed to optimizing the laser pulsing conditions to achieve optical scanning based on the result of a first scan—e.g. a stochastic scan.

The second light pattern may only illuminate a sub-area of an area illuminated by the first light pattern and the at least one pulse property may comprise at least one selected from the group comprising: pulse duration, peak power and repetition rate. Some embodiments relate to a stochastic scan of a scene to identify at least one region of interest followed by a second scan of the region of interest. Once the regions of interest are "locked on" the method may comprise adjusting the laser pulse (e.g. duration, power, repetition frequency) depending on the known properties for a block of the field of view (based on the recent point cloud data). For example, increase pulse duration which may reduce the depth resolution but will increase the pulse energy and thereby at least ensure that some return photons are measured. Once the regions of interest are defined, after the initial generic scan, the method comprises tailoring the laser pulse duration and repetition frequency, in order to obtain as many as possible photon returns from the specific areas.

The method may further comprises calculating the speed of an object in the sub-area or a change in the speed of an object in the sub-area based on the difference between a time of flight measurement associated with the first light return and a time of flight measurement associated with a second light return detected from the scene in response to projection of the second light pattern onto the scene. The method may additionally comprise computing if there is any displacement in the time of flight histogram from these regions for each frame capture and calculate the velocity of other objects. The method may yet further comprises repeating the steps of projecting the first light pattern and second light pattern after calculating the speed of another object.

The second light pattern may comprise an array of light spots and the method may further comprise reducing the number of light spots of the second light pattern in the sub-area before the repeated projection of the second light pattern. Once holographic LiDAR has identified that the object that has "locked on" is another moving object—e.g. another vehicle—then there is no need to monitor it with a large number point in the point cloud but with as few as possible, allowing the rest of the scene to be scanned as well.

The first light pattern and second light pattern may be projected onto the scene at substantially the same time. The first array of light-modulating pixels and second array of light-modulating pixels may be pixels of the same spatial light modulator. This feature makes efficient use of the spatial light modulator and introduces a degree of freedom in power distributed to different regions of the scene. Alternatively, the first array of light-modulating pixels may be pixels of a first spatial light modulator and the second array of light-modulating pixels may be pixels of a second spatial light modulator.

For example, the first hologram may direct the first light pattern to a central region of the scene and the second hologram may be direct the second light pattern to a peripheral region of the scene. The inventors have recognized that different light pulse characteristics may be optimal for these different parts of the scene.

The at least one property may be repetition rate and the repetition rate of the second pulsed light forming the second light pattern may be greater than the repetition rate of the first pulsed light forming the first light pattern. Again, the optimal range associated with the sides of the scene may be less than the optimal range associated with the centre of the scene. The inventors have appreciated that the repetition rate must be decreased with range to avoid wraparound ambiguity.

The first step of displaying a first hologram of a first light pattern on a first array of light-modulating pixels and illuminating the first hologram with first pulsed light in order to project the first light pattern onto the scene may further comprise, at substantially the same time, displaying the second hologram of the second light pattern on the second array of light-modulating pixels and illuminating the second hologram with the first pulsed light in order to co-project the first and second light pattern onto the scene using the first pulsed light. This provides additional pulses to the edges of the scene, where rapid pulses are desirable to detect close objects.

In accordance with this disclosure, each light pattern may be a structured light pattern comprising a plurality (e.g. array) of light spots and each light return may be detected by an array detector comprising a plurality of individual detection elements.

In some examples, the spatial light modulator applies phase-only modulation to the light received. The spatial light modulator may thus be a phase-only spatial light modulator. This may be advantageous because no optical energy is lost by modulating amplitude. Accordingly, an efficient holographic projection system is provided. However, the present disclosure may equally be implemented on an amplitude-only spatial light modulator or an amplitude and phase (complex) spatial light modulator. It may be understood that the hologram will be correspondingly phase-only, amplitude-only or fully-complex.

The term "hologram" is used to refer to the recording which contains amplitude and/or phase information about the object. In this disclosure, the input, or received, hologram is a hologram. The entirety of the output, computer-generated, hologram is also a hologram—the term "hologram" encompasses the combination of a full-tile of the input hologram and additional part-tiles. The term "holographic reconstruction" is used to refer to the optical reconstruction of the object which is formed by illuminating the hologram. The term "replay plane" is used to refer to the plane in space where the holographic reconstruction is formed. The terms "image", "image region" and "replay field" refer to areas of the replay plane illuminated by light forming the holographic reconstruction. In some embodiments, the "image" comprises image spots which may be referred to as "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" or "represent" a light modulation distribution or pattern in response to receiving the plurality of control values.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "light" is used herein in its broadest sense. some embodiments are equally applicable to visible light, infrared light and ultraviolet light, and any combination thereof.

The present disclosure refers to or describes 1D and 2D holographic reconstructions by way of example only. The holographic reconstruction may alternatively be a 3D holographic reconstruction. That is, in some examples of the present disclosure, each computer-generated hologram forms a 3D holographic reconstruction.

BRIEF DESCRIPTION OF THE DRAWINGS

Specific embodiments are described by way of example only with reference to the following figures:

FIGS. 8A, 8B and 8C illustrates how time of flight measurements are affected by relative velocity.

The same reference numbers will be used throughout the drawings to refer to the same or like parts.

DETAILED DESCRIPTION

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in a co-dependent relationship.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

Optical Configuration

Figure 1:
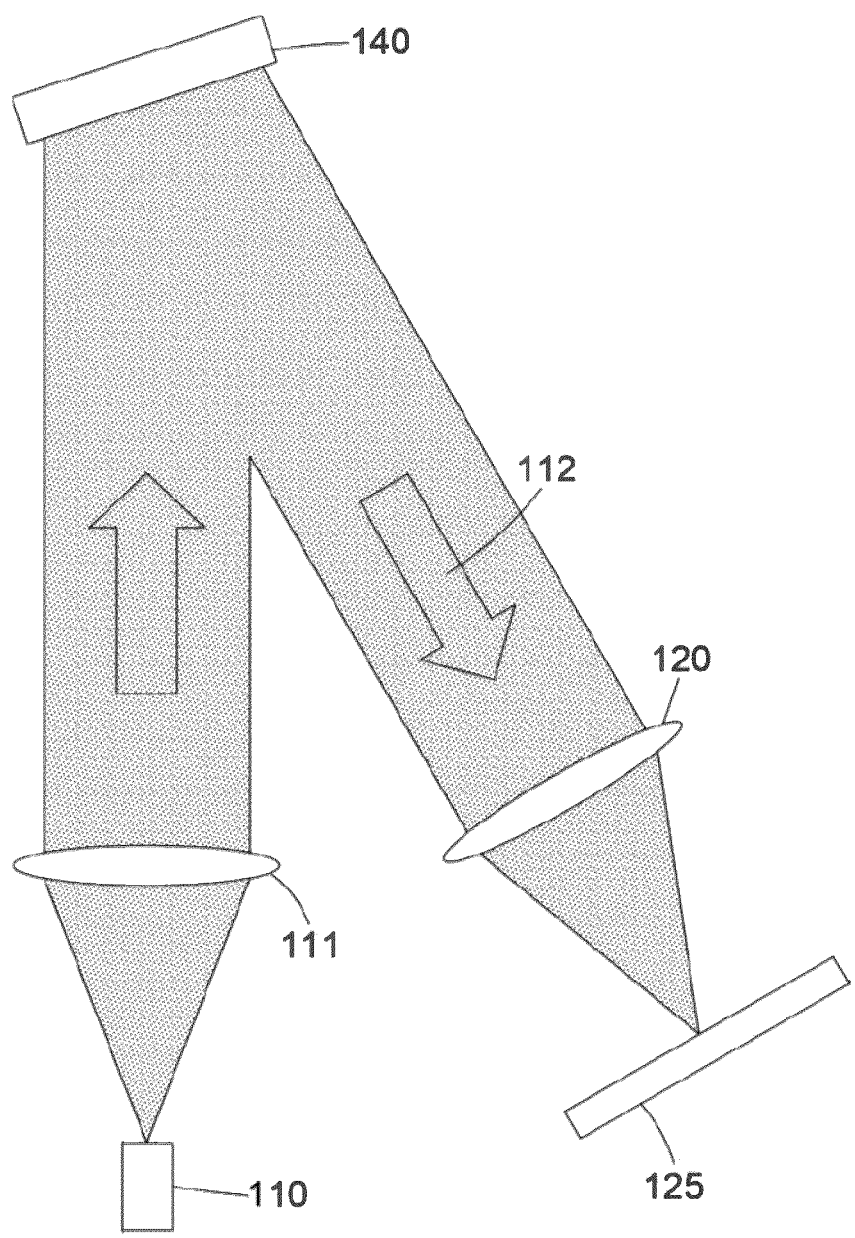
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of IA(x, y) and IB(x, y), between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
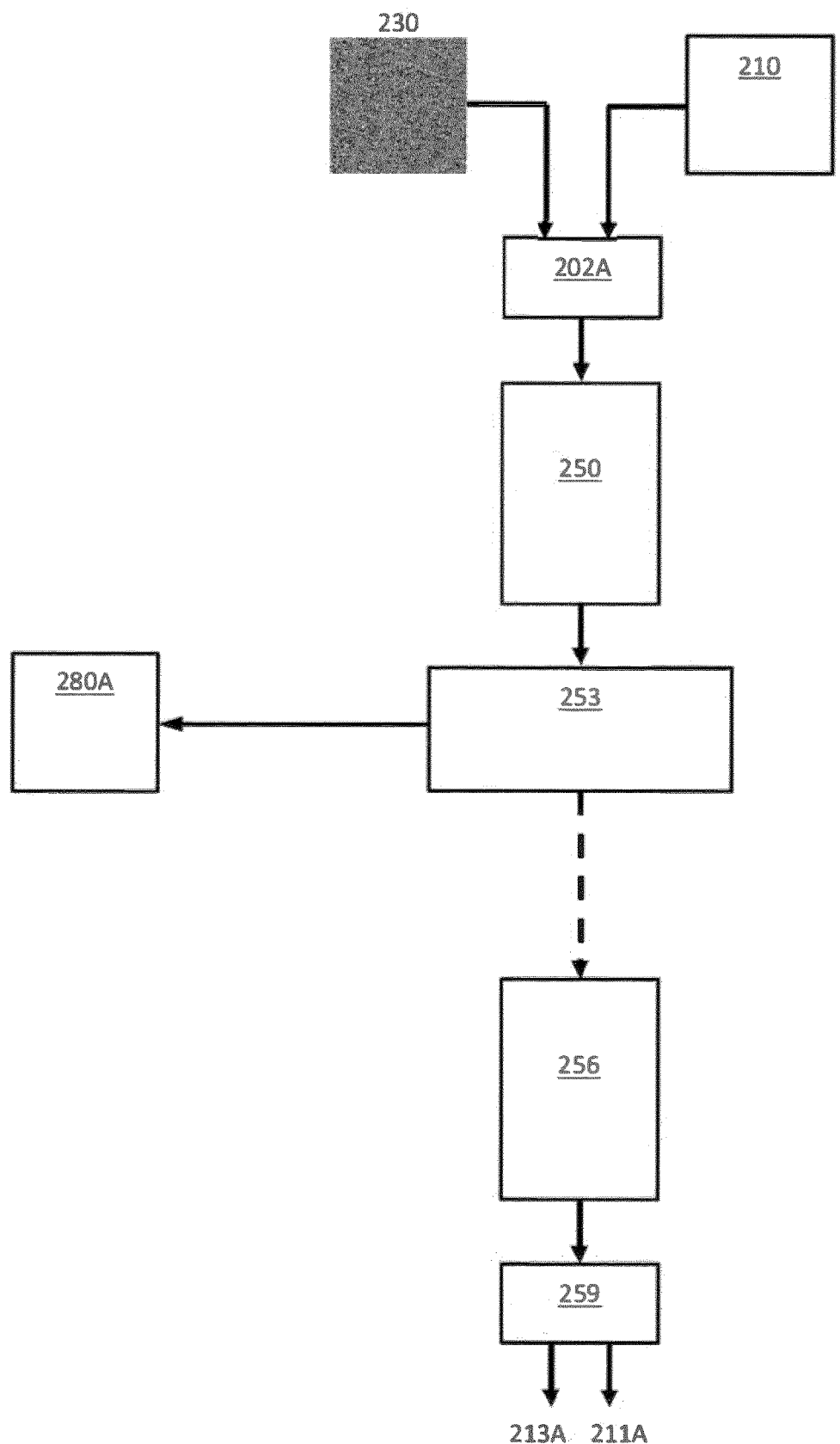
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
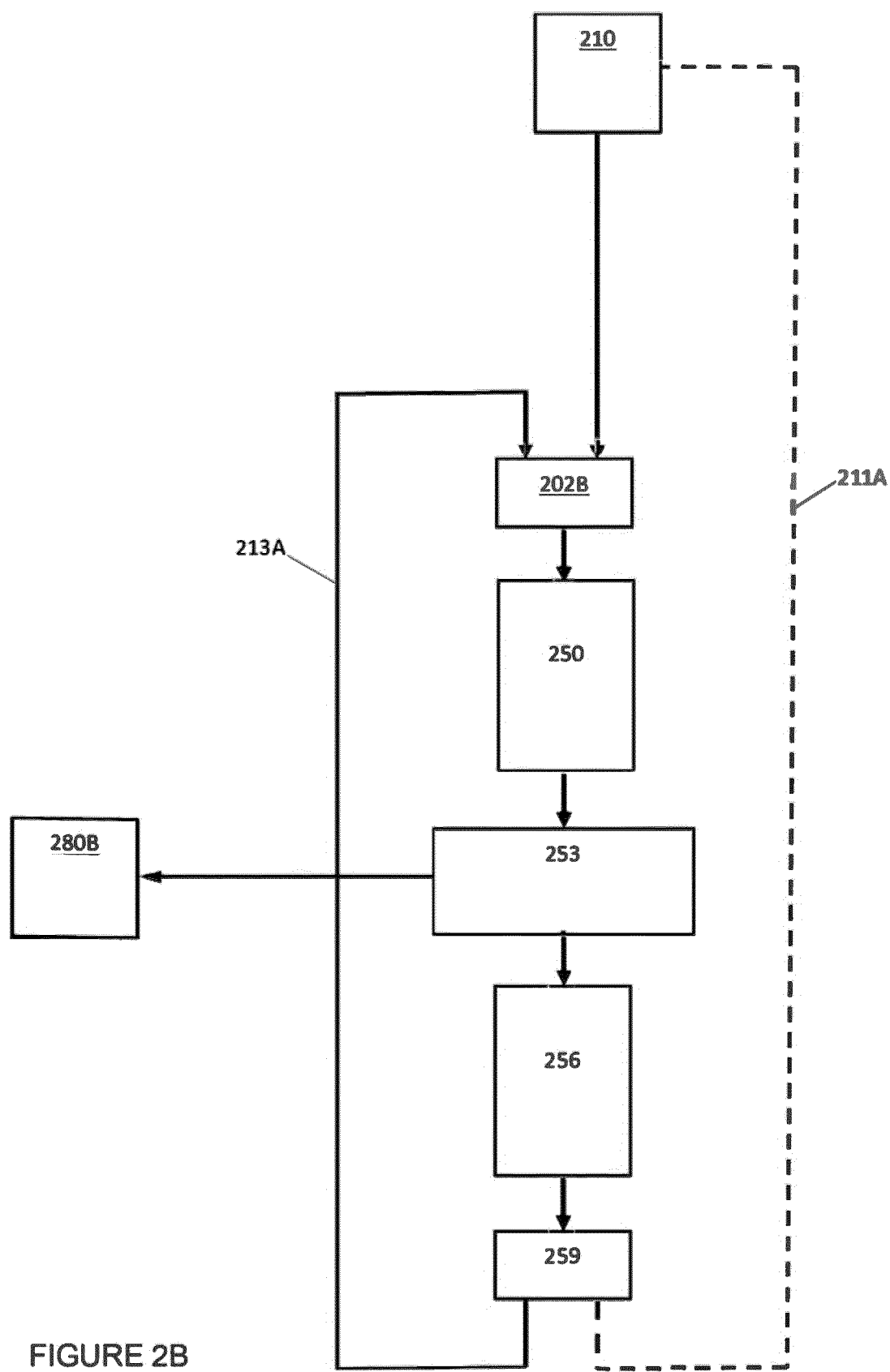
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
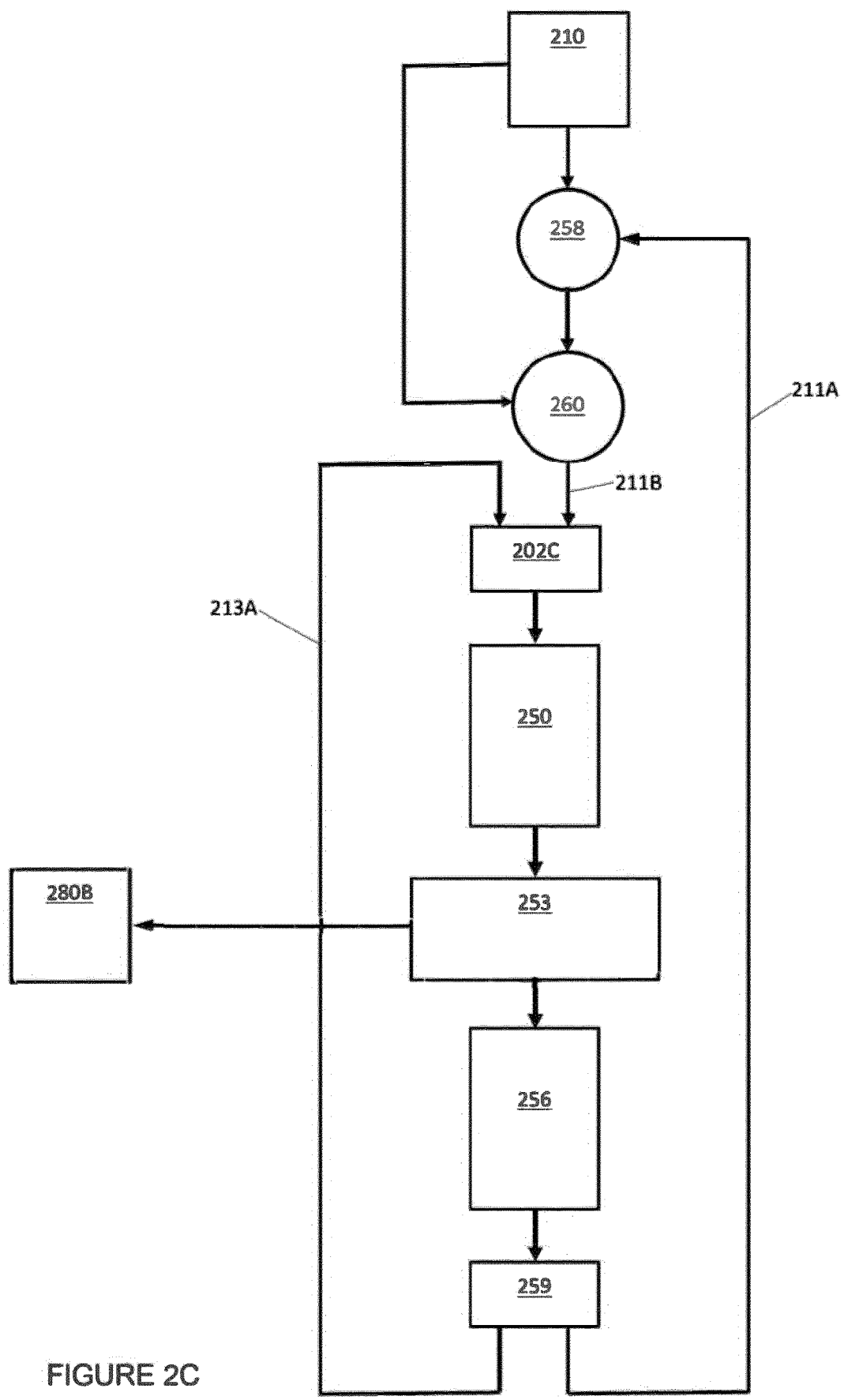
FIG. 2C illustrates alternative second and subsequent iterations of the example.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the light modulation (or diffractive) pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of pixels within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
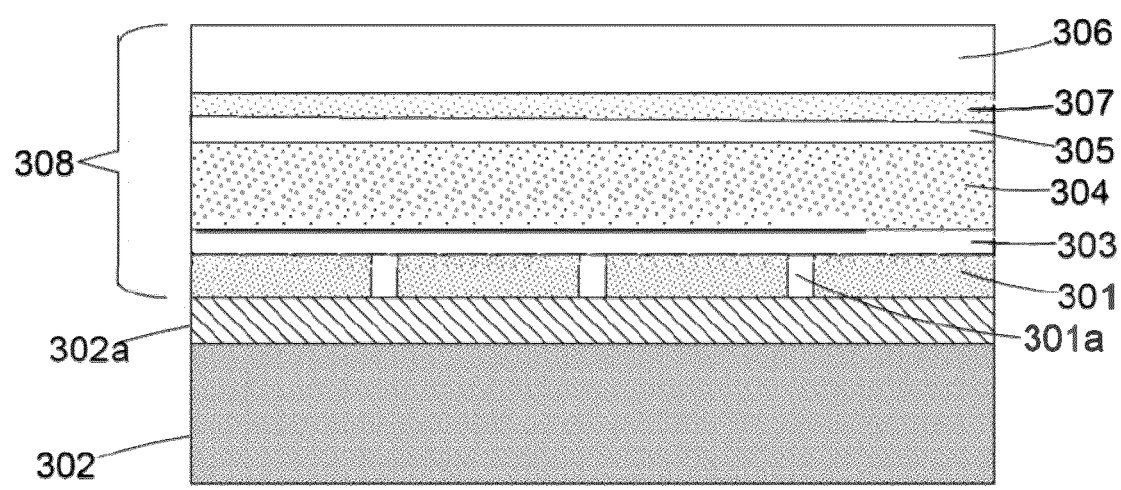
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of dynamic light patterns). However, the teachings of the present disclosure may equally be implemented using a transmissive LCOS SLM. In embodiments, the received computer-generated hologram is an input hologram to a tiling engine. The input hologram is "tiled" on the spatial light modulator in accordance with a tiling scheme and the tiling scheme is dynamically changed, for example, it is changed between input holograms. The concepts of a "tile" and "tiling" are further explained with reference to FIG. 8.

Light Detection and Ranging Using an Array of Time of Flight Measurements

The light detection and ranging, "LiDAR", system of the present disclosure is arranged to make time of flight measurements of a scene. The LiDAR system comprises a holographic projector comprising: a spatial light modulator arranged to display light modulation patterns, each light modulation pattern comprising a hologram and, optionally, a grating function having a periodicity; a light source arranged to illuminate each displayed light modulation pattern in turn; and a projection lens arranged to receive spatially modulated light from the spatial light modulator and project a structured light pattern corresponding to each hologram onto a respective replay plane. The position of the structured light pattern on the replay plane may be determined by the periodicity of the optional grating function. The LiDAR system further comprises a detector comprising an array of detection elements and an imaging lens arranged such that each detection element receives light from a respective sub-area of the holographic replay plane, wherein the sub-areas collectively define a field of view of the detector on the replay plane.

The field of view of the detector may be continuous. That is; the individual fields of view of the light detecting elements comprised within the detector may form a continuous area. That is; there may be no gaps between adjacent individual fields of view (IFOV's) of the respective light detecting elements.

The light source may be a laser light source. The light may be, for example, infra-red (IR) light, visible light or ultraviolet light.

The system controller may be configured to provide an output to the detector. For example, it may provide an output indicating the timing and/or duration of light pulses, from the light source.

The grating function (also known as a phase-ramp function or a software grating) may be added to the hologram in order to provide a linear displacement of the light pattern on the (holographic) replay plane. The period of the grating function may determine the magnitude of the displacement. A repository of different grating functions may be provided, and a feedback system may be incorporated to select the required grating function from the repository of different grating functions, based on a control signal.

The system may be arranged to observe or 'interrogate' a plane in space, within a scene. The distance of that plane, from the holographic projector and the detector, may be variable. The system may be arranged to continually probe a scene. It may be said that the system provides a temporal sequence of light detection and ranging 'frames' (or display events). Each frame may comprise a display event (or 'an illumination event') and a detection event. Each frame has a corresponding range that defines the location of the plane in the scene that will be interrogated. The plane that will be interrogated may be substantially parallel to a plane of the source and detector. The range is a perpendicular distance between those two planes, in such an arrangement.

The structured light pattern comprises a plurality of discrete light features, wherein each discrete light feature is formed within a respective sub-area of the sub-areas that collectively define the field of view of the detector. The structured light pattern may have a non-uniform brightness across its area within the replay field. The discrete light features (also called "light spots" herein) may be separated by dark areas, and/or may be a pattern of light of graded brightness or intensity. The structured light may be characterised by its form, shape and/or pattern.

The light detection and ranging system may be used to form a temporal sequence of varying structured light patterns within a scene. The sequence may be derived from a pre-determined sequence, or it may be a random sequence, or it may be a sequence arising from selections and determinations made by the controller, based on signals or other information received during, or as a result of, previous operation of the system.

The system may be configured such that a plurality of different points (on the same plane or within a depth of focus provided by the projection lens) in the scene may be interrogated at the same time. This may be achieved by illuminating the scene with structured light (e.g. a periodic array of discrete light spots) and using an array of detection elements combined with an imaging lens such that there is correlation between discrete light spots and individual detection elements. The person skilled in the art of optics will understand how the imaging lens may be chosen based on the desired detection resolution within the scene and so a detailed description of the design of the imaging lens is not required below.

The system may be arranged to make a time of flight measurement in relation to each discrete light feature of a structured light pattern based on a detection signal from the corresponding detection element in order to form a plurality of time of flight measurements in relation to the structured light pattern. The time of flight may comprise a time that the light has taken to travel from the holographic projector, for example from the spatial light modulator, to the scene and back to the detector.

The light modulation pattern may comprise a lensing function having a focal length, wherein the distance from the spatial light modulator to the replay plane is determined by the focal length. The holographic projector, or a controller associated therewith, may be arranged to determine the focal length of the lensing function that is required to focus the structured light pattern on a replay plane of interest, based on the control signal. In some circumstances, a lensing function will not be needed in order to focus the structured light pattern correctly on a replay plane of interest.

The system controller may be arranged to determine a subsequent structured light pattern of a sequence of structured light patterns based on detection signals received from the array of detection elements. For example, the detection signals may give an indication of the distance of an object, or of a part of an object, or of the lack of an object, at a particular distance and the controller may use that information to select and control the structured light pattern that will be used next (or subsequently) to illuminate the scene.

The distance information may define the location of the replay plane in the scene for a subsequent structured light pattern. The distance information may, in other words, be the distance between the spatial light modulator and the replay plane, for that subsequent structured light pattern.

The spatial light modulator and the array of detection elements may be substantially parallel to one another and spatially separated. That is; they may occupy a common plane.

The projection lens and the imaging lens may be substantially parallel to each other. That is; they may occupy a common plane.

The projection lens and imaging lens may be substantially parallel to the spatial light modulator and array of detection elements. The distance between the spatial light modulator and the replay plane (which may be referred to as the 'range' of the system) may thus be a substantially perpendicular distance.

The distance information may define a plane in the scene. The scene may comprise, or be comprised within, a detected object.

The following first, second and third groups of embodiments describe a method of light detection and ranging comprising: a first step of displaying a first hologram of a first light pattern on a first array of light-modulating pixels and illuminating the first hologram with first pulsed light in order to project the first light pattern onto the scene; and a second step of displaying a second hologram of a second light pattern on a second array of light-modulating pixels and illuminating the second hologram with second pulsed light in order to project the second light pattern onto the scene, wherein at least one pulse property of the first pulsed light is different to that of the second pulsed light.

First Group of Embodiments

A first group of embodiments are described below by way of example only of broader concepts that relate to changing at least one pulse property of pulsed light for LIDAR with dynamic range and range resolution based on at least one parameter associated with a characteristic of vehicle motion (e.g. speed, cornering angle, current manoeuvre, . . . ), and/or a characteristic of the road situation (e.g. weather, background light, number of nearby vehicles, traffic signal, road curvature, . . . )

Some embodiments revolve around the use of tailored (i) optical pulse duration, (ii) repetition frequency and (iii) hologram pattern adaptation, based on real-time input e.g.

from a vehicle such as, in a simplistic example, from a vehicle's speedometer. That is, in these embodiments, a second light pattern is projected onto the scene after the first light pattern. In an embodiment, a closed-loop system is provided, where the vehicle's speed dictates the required range of detection, the range resolution for each range and finally the necessary field of view. For example, depending on the speed of the vehicle, the pulse duration and subsequently peak power of the emitted optical LiDAR pulses dynamically change, in order to either have (a) short duration and/or low peak power pulses or (b) longer and/or higher peak power pulses. Moreover, the repetition frequency of the optical pulses and at the same time the focus of the field of view will change, in order to "sample" the near and far field in an optimum manner. In these embodiments, a second light pattern is projected onto the scene after a first light pattern.

In some embodiments, a relatively low repetition rate and high energy per pulse (high peak power and/or long pulse duration) is used for relatively long ranges. Relatively short pulse duration is used to achieve high range precision. Laser safety caps the average power that may be projected. Therefore, if the repetition rate is reduced then more energy can be used in each pulse. So as the repetition rate is reduced, in some embodiments, the peak power and/or pulse duration are increased so the average power remains the same. Additionally or alternatively, the pulse duration may be increased to increase the energy per pulse.

Figure 4A:
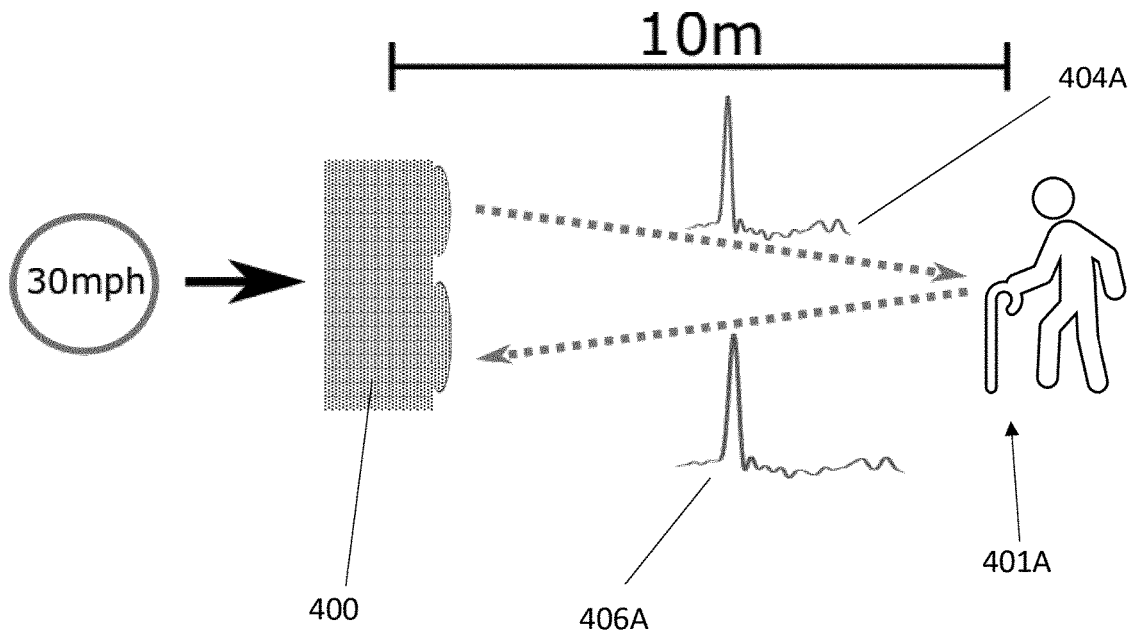
FIGS. 4A and 4B shows a short pulse duration and long pulse duration, respectively, in accordance with embodiments.
Figure 4B:
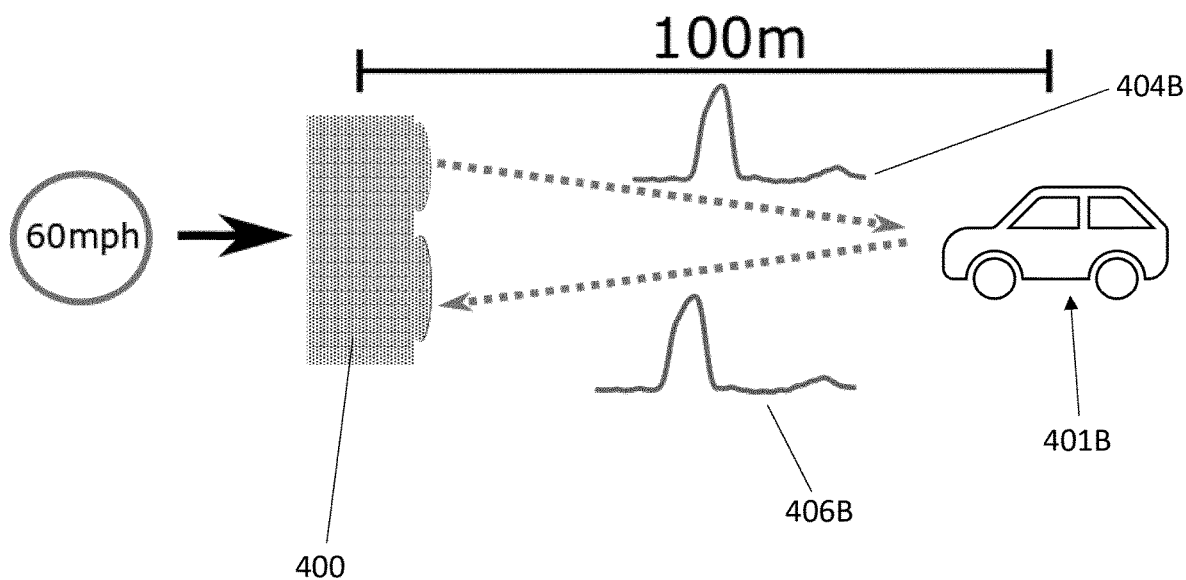

FIGS. 4A and 4B illustrate how the optical pulse duration is changed based on the speed of the car. At relatively low speed, it is not primarily important what is happening at e.g. 100 m ahead of the car and attention needs to be mainly on the near field. In this case, the optical pulse duration needs to be short, in order to increase the system's range precision and reconstruct the position of objects that are near the car with greater positional precision. When the vehicle is moving fast, the range over which information is needed is long but the acceptable range precision may be lower (at 60 mph a car covers ~27 metres/sec), thus, the optical pulse duration may be increased and subsequently the energy per pulse and the average optical power may increase as well, in order to reconstruct the position of objects at greater range.

More specifically, FIG. 4A shows a LIDAR device 400 comprising a light projector arranged to project light patterns onto a scene and a light detector array to detect reflected light of the light patterns. In accordance with this disclosure, the light projector may be a holographic projector and the light detector may be an array detector such as a SPAD array. FIG. 4A shows a first incident light pulse 404A, having a spatial light pattern not shown, and a first reflected light pulse 406A. A time of flight, "ToF", measurement may be made in order to determine the distance of near object 401A from which the light has been reflected. FIG. 4B shows the corresponding second incident light pulse 404B and second reflected light pulse 406B from a distant object 401B. In accordance with this embodiment, the pulse duration of the light has been increased in order to make time of flight measurements associated with the distant object. The pulse duration of second incident light pulse 404B is greater than the pulse duration of first incident light pulse 404A. It may be said that the pulse duration has been increased with range. In overview, the at least one pulse property that is changed comprises pulse duration and the method comprises selecting (e.g. modulating) the pulse duration of the second pulsed light to be greater than that of the first pulsed light if the measured change in the speed of the vehicle indicates that the speed of the vehicle has increased, or vice versa.

Figure 4C:
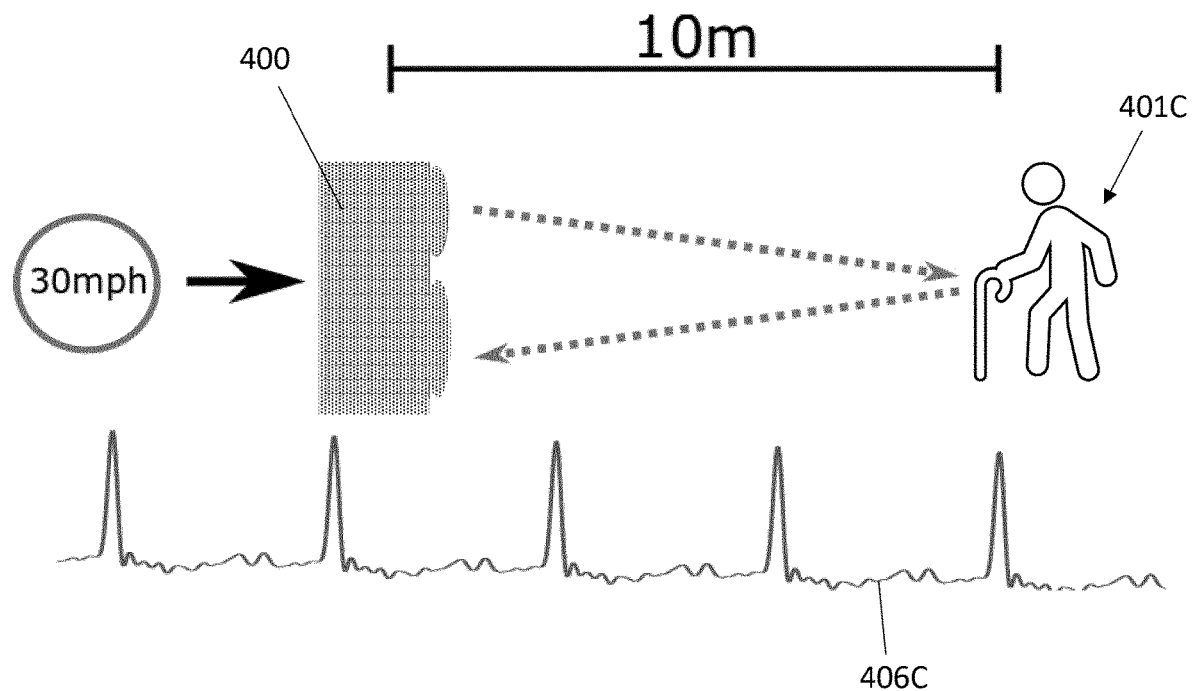
FIGS. 4C and 4D show a high pulse repetition rate and low pulse repetition rate, respectively, in accordance with embodiments.
Figure 4D:
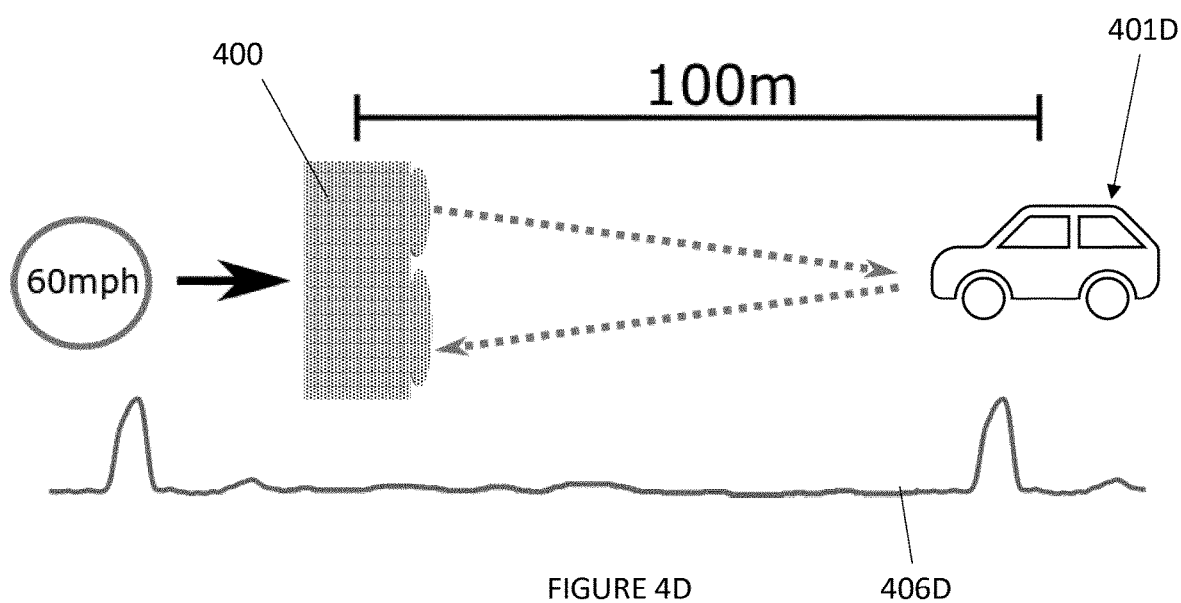

FIGS. 4C and 4D illustrates how the repetition frequency may change as well, according to the vehicle's speed data, in order to provide a type of "range-gating", which will allow the system to focus on time of flights, "ToF", of photons that are coming from the near field when the speed is low and vice versa.

More specifically, FIG. 4C shows a first pulse train 406C used to illuminate a first hologram arranged to make time of flight measurements in associated with a near object 401C. The light pulses of the first pulse train are relatively close in time. In other words, the pulse repetition rate is relatively high. FIG. 4D shows the corresponding second pulse train 406D used to illuminate a second hologram arrange to make time of flight measurements in association with a distant object 401D. The light pulses of the second pulse train 406D are relative far apart in time. In other words, the pulse repetition rate is relatively low. The pulse repetition rate of the first pulse train 406C is greater than that of the second pulse train 406D. It may be said that the pulse repetition rate has been decreased with range. In overview, the at least one pulse property that is changed comprises repetition rate and the method comprises selecting the repetition rate of the second pulsed light to be greater than that of the first pulsed light if the measured change in the speed of the vehicle indicates that the speed of the vehicle has decreased, or vice versa.

Figure 5A:
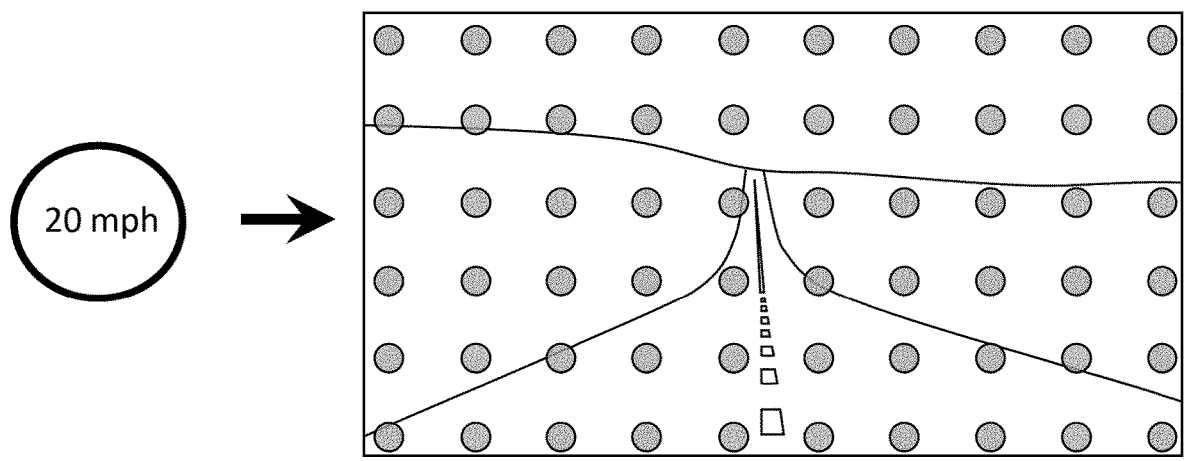
FIGS. 5A, 5B and 5C shows three different light patterns selected based on speed.
Figure 5B:
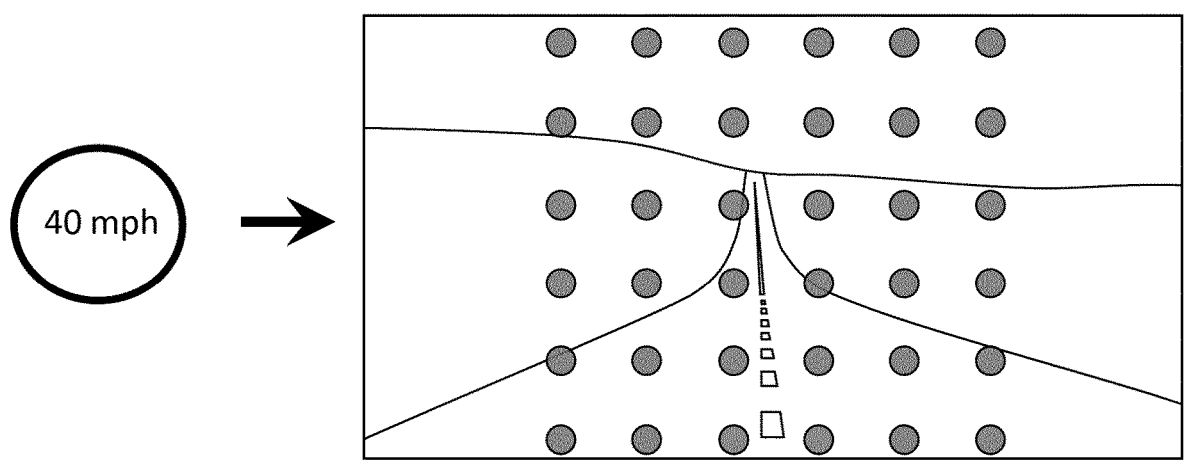
Figure 5C:
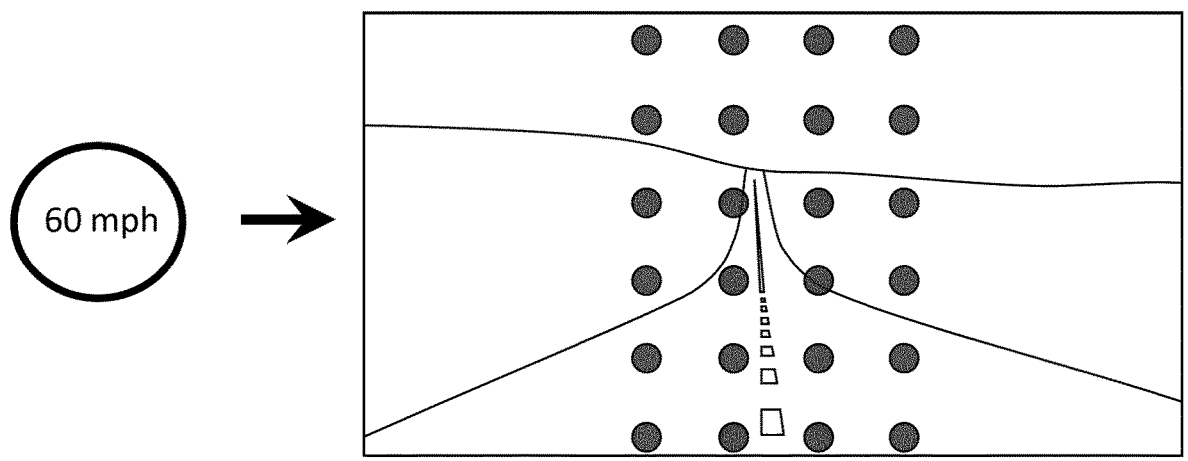

FIGS. 5A, 5B and 5C show how the emitted light pattern is adapted, based on the vehicle's speed. For low speeds, the pattern (in embodiments it is an array of dots by way of example only but it can be any type of light pattern that covers the whole scene, e.g. a continuous plane) is "sampling" the whole scene (or field of view). The dots are illustrated as faded in order to represent that the optical energy per pulse in each dot may be relatively low since the pulse duration is set to a low value and the overall power is spread across the whole field of view by the holographic process. For a higher vehicle speed, the hologram distributes light only into a first central region of the field of view. In this case detection of objects at longer range in the direction of motion of the vehicle is prioritised. Dots are illustrated as brighter, since now the optical pulse duration has increased, thus, the optical energy per pulse has increased as well and the hologram distributes the overall power only into the first central region of the field of view. In these embodiments, the magnitude of the difference between the at least one pulse property of the first pulsed light and that of the second pulsed light is based on a measured change in the speed of the vehicle after projection of the first light pattern.

FIGS. 5A, 5B and 5C show how the spatial extent of the light pattern in the horizontal direction (during normal usage) is decreased with speed in order to concentrate on the centre of the field of view. In embodiments, the spatial extent of the light pattern is decreased by omitting light spots of the array. This may be achieved by changing or recalculating the hologram. The light spots in FIG. 5C are brighter than those in FIG. 5A (and FIG. 5B) partly because there are fewer of them. The reader will appreciate the natural synergy between this method and holography. In overview, the method comprises selecting the second hologram so that size of the second light pattern projected onto the scene in the horizontal direction is less than that of the first light pattern if the measured change in the speed of the vehicle indicates that the speed of the vehicle has increased, or vice versa. The first light pattern and second light pattern each comprise an array of light spots that may have a periodicity in common such that the second light pattern comprises fewer light spots in the horizontal direction than the first light pattern.

In some embodiments, the at least one pulse property that is changed comprises peak power and the method comprises selecting the peak power of the second pulsed light to be greater than that of the first pulsed light if the measured change in the speed of the vehicle indicates that the speed of the vehicle has increased, or vice versa.

The first group of embodiments is directed toward providing optimal optical power and range detection of the scene, depending on the speed of the vehicle. Holographic automotive LiDAR allows optical pulse duration and repetition frequency to be adapted at the same time as changing the field of view in order to "steer" the optical power to specific parts of the scene and thus, maximise performance.

Second Group of Embodiments

Embodiments described below relate to optimal laser pulsing conditions to achieve optimal scanning and additional processing that can be achieved by focusing on specific regions of the scene.

Figure 6:
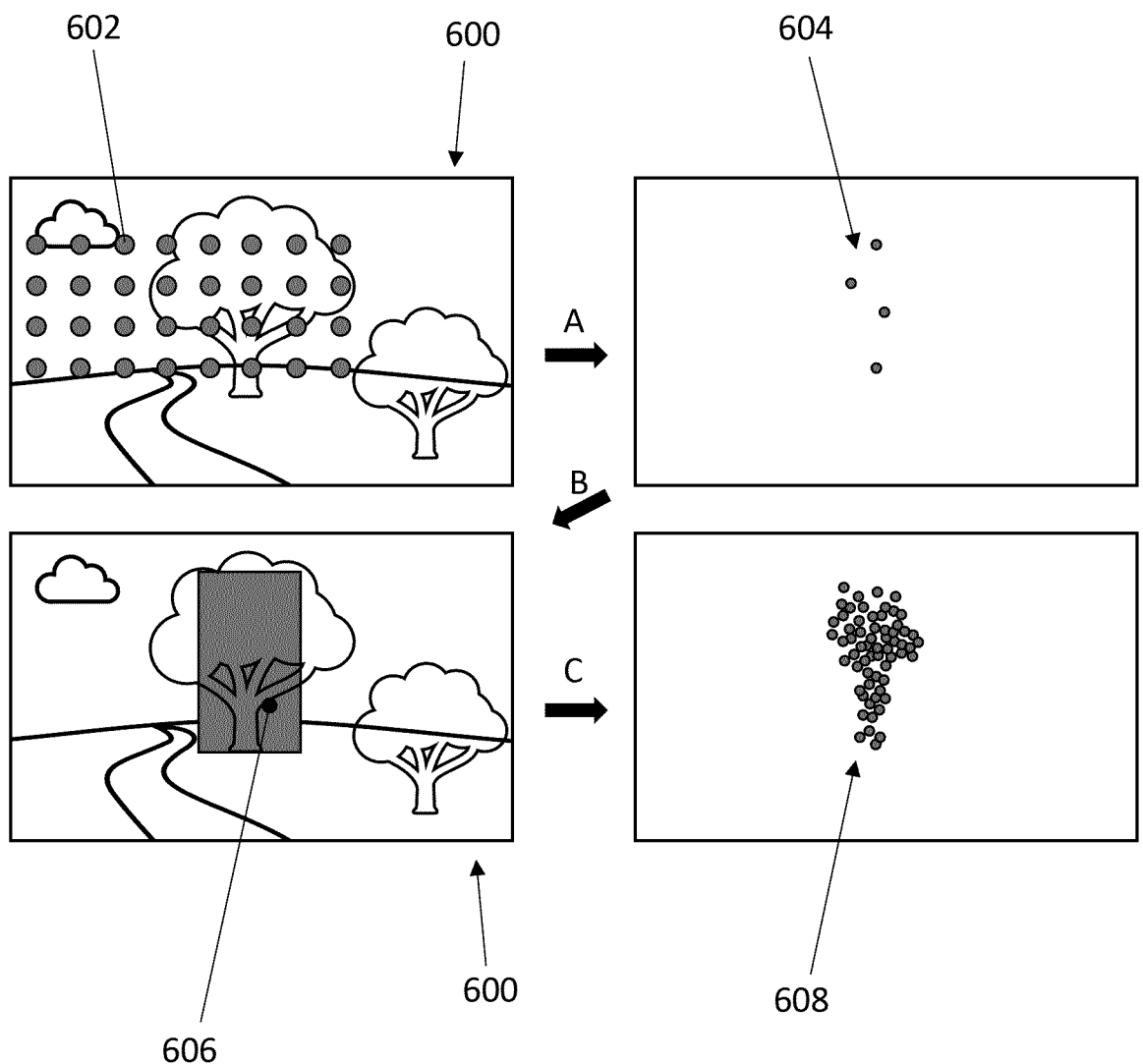
FIG. 6 shows a stochastic scan followed by a detailed scan of an object in accordance with embodiments.

FIG. 6 shows initial emission of a generic hologram pattern (e.g. dot array pattern) to scan the whole area in front of the LIDAR system and once return photons from a specific area of the field of view start to form (e.g. point cloud points are generated), then the system dynamically changes the hologram to a pattern that focuses on this specific region (for example parallelogram stretched either in the horizontal or vertical axis), aiming to capture more photon returns (point cloud points) from this specific area of interest. If unsuccessful (depending on the number of photon returns) the hologram can switch back to the generic scanning (e.g. dot array pattern).

More specifically, FIG. 6 shows a first illumination event in which a first light pattern 602 comprising an array of light spots illuminates a relatively large area of the scene 600. Arrow A indicates a transition from the first illumination event to a first data capture event in which an array of first light return signals 604 is received from the scene. In this example, the array of first light return signals 604 correspond to a tree. Arrow B indicates a transition from the first data capture event to a second illumination event in which a second light pattern 606 illuminates a sub-area of the area illuminated by the first light pattern 602. The second light pattern 606 is concentrated on the tree identified by the first data capture event. In other words, the second light pattern only illuminates a sub-area of an area illuminated by the first light pattern. Arrow C indicates a transition from the second illumination event to a second data capture event in which an array of second light return signals 608 is received from the scene. A larger number of individual return signals are received during the second data capture event than during the first data capture event.

Once the regions of interest are "locked on", the method may comprise adjusting the laser pulse (e.g. duration, peak power, repetition frequency) depending on the known properties for a block of the field of view (based on the recent point cloud data). For example, increase pulse duration which may reduce the range precision but will increase the pulse energy and thereby increase the likelihood that some reflected return photons are measured. The method may comprise detecting a first light return corresponding to projection of the first light pattern onto the scene and making a measurement associated with the first light return. The magnitude of the difference between the at least one property of the first pulsed light and that of the second pulsed light may be determined by the measurement associated with the first light return.

By way of example only, the method in accordance with these embodiments may comprise changing at least one pulse property for a region with known range; for a region with known reflectivity (e.g. high reflectivity such as a number plate in field or specular reflection from metal paint or low reflectivity such as tyre in road; and/or for a region with high background (e.g. sunlight background or an interfering LiDAR source).

Figure 7A:
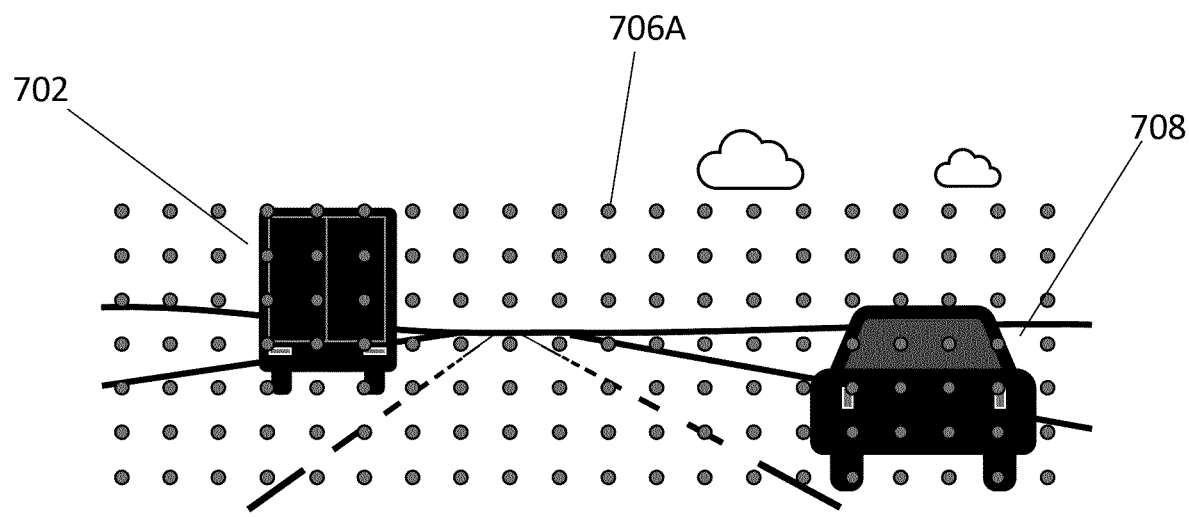
FIGS. 7A and 7B show first and second light patterns in accordance with embodiments.
Figure 7B:
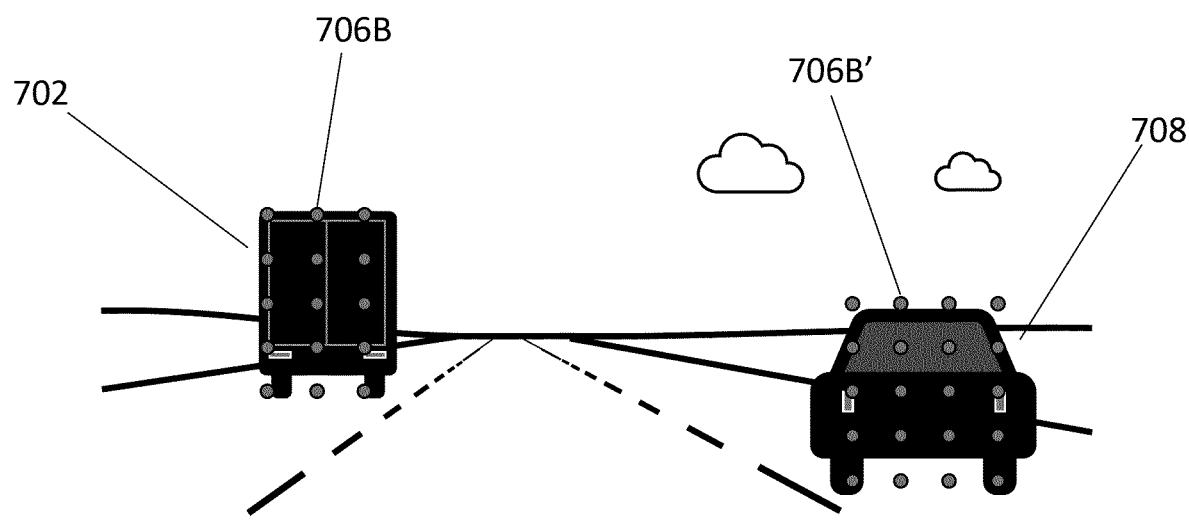

FIGS. 7A and 7B illustrate additional information that can be extracted from the regions of interest in accordance with these embodiments. In the example shown, the method of the present disclosure is performed from a holographic LiDAR system on a first vehicle travelling on a highway road at 50 mph in the middle lane of the highway and there are two more vehicles travelling on the left and right lane ahead (first other vehicle and second other vehicle, respectively). The holographic LiDAR starts scanning the scene with a generic hologram and then "identifies" these two vehicles on the left and right side ahead. In accordance with these embodiments, the holographic pattern changes and concentrates on these two objects ahead.

More specifically, FIG. 7A shows a first illumination event in which a relatively large area of the scene is illuminated with a first light pattern 706A comprising an array of light spots. A first light return signal corresponding to the first illumination event indicates the presence of the two other vehicles 702 and 708. In response to the first light return, a second illumination event is performed using a second light pattern comprises a first array of light spots 706B directed on the first other vehicle 702 and a second array of light spots 706B' directed on the second other vehicle 708. The first array of light spots 706B and a second array of light spots 706B' are projected onto the scene at substantially the same time. The first array of light spots 706B and a second array of light spots 706B' are spatially separated. However, the spatial separation of the light spots within each array of light spots is the same. The number of light spots of the first array of light spots 706B is different to the number of light spots of the second array of light spots 706B' but, in other examples, it is the same. The brightness of each light spot of the second light pattern is greater than the brightness of each light spot of the first light pattern because the second light pattern comprises fewer light spots than the first light pattern.

The rest of this section, in so far as it relates to the second group of embodiments, describes simplified examples merely to aid understanding of the more complex concepts described elsewhere in this disclosure.

If the first other vehicle and the second other vehicle are moving with the same speed as the first vehicle, then the relative distance between the three vehicles will remain the same and the return photons of the light return from the targets will suggest that the objects in the scene are static. This means that these two vehicles, which the system has "locked on", will have a fixed distance from the vehicle performing LIDAR and the time of flight of the return photons will be constant. In this case, the system determines all these objects have the same speed as the first vehicle and the method comprises informing the driver or autonomous vehicle processing unit that these two vehicles ahead are also travelling with 50 mph.

If the vehicles in the right lane (708) accelerates from 50 mph to 60 mph, the return photons of the light return signals will show a shift in the time of flight (specifically, an increase) because the photons take more time to reach the vehicle which is now further away because its speed has increased. By comparing the time of flight (peak) of each frame, the method further comprises calculating the new speed of the vehicle ahead based on the displacement of that vehicle during the frame period and the known speed of the LIDAR vehicle. Once the speeds of the two other objects (702 and 708) are calculated, the method may comprises repeating the generic scan (i.e. the first light pattern 706A of FIG. 7A) and investigating if there is any change in the scene and, if yes, the method may comprise scanning the new object, otherwise, the method may comprise continuing to check the same objects (i.e. objects 702 and 708) for any speed change (e.g. using the second light pattern of FIG. 7B or a light pattern closely derived from the second light pattern).

FIGS. 8A, 8B and 8C illustrates how the time of flight histograms for each region of interest (for example the average of all pixels/spots of each region) will shift between different frames/captures of the Holographic LiDAR system, depending on the dynamic change of the distance between the LIDAR vehicle and the "locked" targets.

Specifically, FIG. 8A shows a first set of frames comprising a first light return 802 from the vehicle on the left and a second light return 804 from the vehicle on the right. FIG. 8B shows a first example in which the speed of the car on the right is increasing. FIG. 8B shows a second set of frames (after the first set of frames) in which the separation between the second light return 804' from the vehicle on the right and the first light return 802' from the vehicle on the left is increasing with each frame. FIG. 8C show a second example in which the speed of the truck on the left is decreasing. FIG. 8C also shows a second set of frames (after the first set of frames) in which the separation between the second light return 804" from the vehicle on the right and the first light return 802" from the vehicle on the left is increasing with each frame.

A notable point in relation to the second group of embodiments is that the restriction of conventional LiDAR where the laser pulse conditions are necessarily the same for the entire field of view is broken. In accordance with these embodiments, once the regions of interest are defined by the initial generic scan, the laser pulse duration and repetition frequency are tailored, in order to obtain as many as possible photon returns from the specific areas. In addition, the method comprises computing if there is any displacement in the time of flight histogram from these regions for each frame capture and, optionally, calculating the velocity of these objects. If the time of the peak of the time of flight histogram decreases, the method determines that the object is static while the LIDAR vehicle is moving or it is moving slower but in the same direction as the LIDAR vehicle or that it is moving towards the LIDAR vehicle. If it increases, then it means that the relative distance to the LIDAR vehicle is increasing.

In some embodiments, object velocity is computed by checking the time of flight displacement between the known frame interval and by taking into consideration the speed of the LIDAR vehicle. In embodiments, the method comprises calculating the velocity of objects focused on before, based on the position of these vehicles, and determining the impact that this position might have on the path of the LIDAR vehicle. In overview, the method comprises calculating the speed of an object in the sub-area or a change in the speed of an object in the sub-area based on the difference between a time of flight measurement associated with the first light return and a time of flight measurement associated with a second light return detected from the scene in response to projection of the second light pattern onto the scene.

Once the system has identified that the object that has been "locked on" is another vehicle, then there is no need to "monitor" it with a large number point in the point cloud but with as few as possible, allowing the rest of the scene to be scanned as well. The method may therefore further comprise reducing the number of light spots of the second light pattern in the sub-area before the repeated projection of the second light pattern.

Third Group of Embodiments

In some embodiments, each light projection comprises sending light to multiple parts of the scene at the same time rather than as single spots. More specifically, each light pattern is a structured light pattern comprising a plurality (e.g. array) of light spots and each light return is detected by an array detector comprising a plurality of individual detection elements. In the third group of embodiments, the first light pattern and second light pattern are projected onto the scene at substantially the same time.

Figure 9:
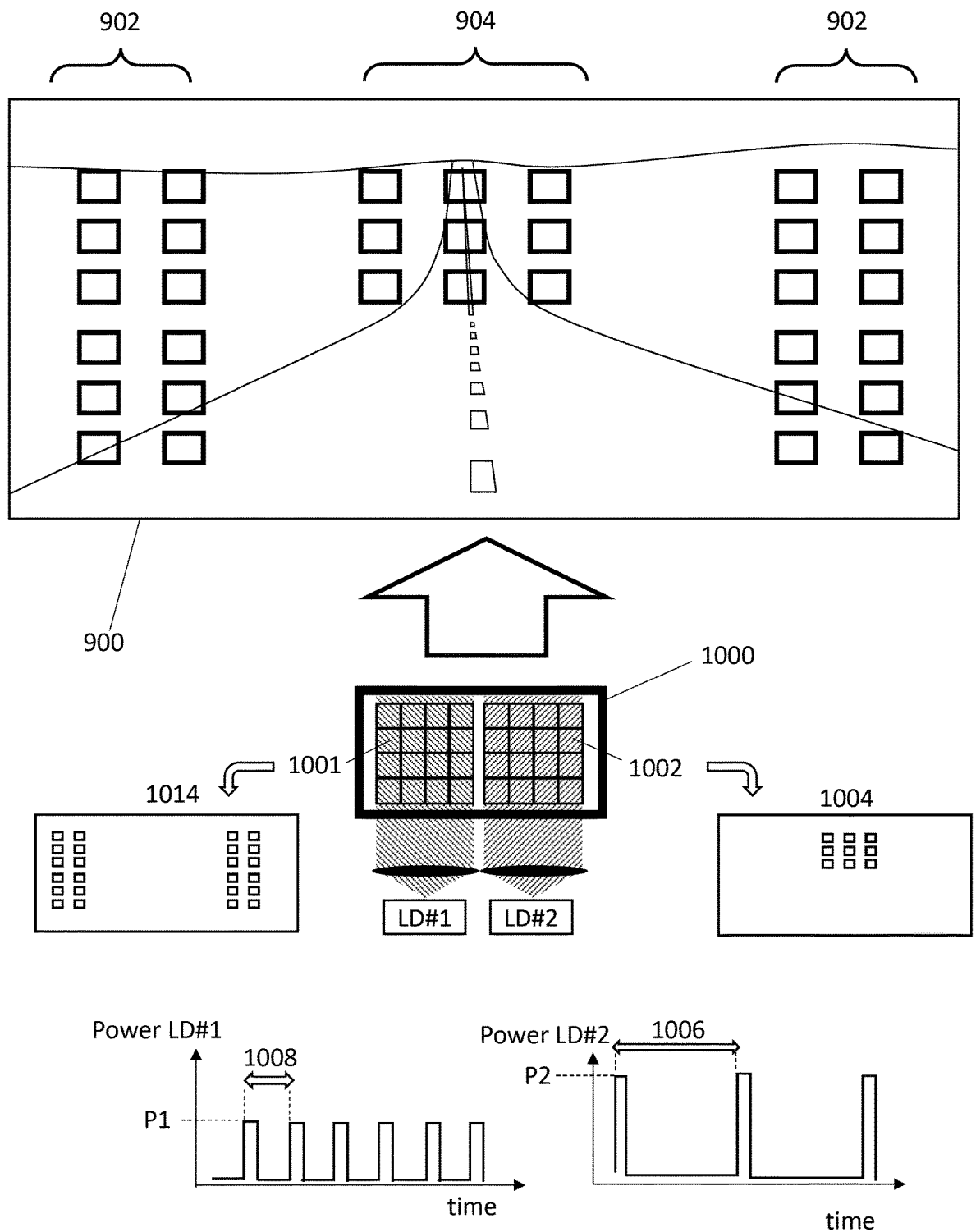
FIG. 9 shows an embodiment using one spatial light modulator and two holograms.

FIG. 9 illustrates a third group of embodiments in which two (or more) laser diodes are used to illuminate two (or more) separate regions of a LCOS (or other SLM, or potentially two different SLM). In the example shown, the first array of light-modulating pixels and second array of light-modulating pixels are pixels of the same spatial light modulator. The different regions of the LCOS steer light to different regions of the scene. In the example shown, the first hologram directs the first light pattern to a central region of the scene and the second hologram directs the second light pattern to a peripheral region of the scene. The two laser diodes can be operated with different repetition frequencies such that different regions of the scene receive illumination suitable for measuring different ranges. In overview, the at least one pulse property that is different is repetition rate and the repetition rate of the second pulsed light forming the second light pattern is greater than the repetition rate of the first pulsed light forming the first light pattern.

In FIG. 9, the illumination from right half of LCOS is distributed (through hologram design) to the centre of the field of view; this region of the LCOS is illuminated by laser diode LD #2 which has a long interval between laser pulses, suitable for long range measurement. The illumination from left half of LCOS is distributed (through hologram design) to the edges of the field of view; this region of the LCOS is illuminated by laser diode LD #1 which has a short interval between laser pulses, suitable for short range measurement. The power of the laser diodes may be configured to efficiently use the eye safety limits (e.g. when the interval between pulses is longer the energy (i.e. integral of pulse power over the pulse duration) in each pulse can be higher while keeping below the overall average power safety limits).

More specifically, FIG. 9 shows a road scene 900 illuminated by a first light pattern 902 and second light pattern 904. The first light pattern 902 comprises a first array of light spots (shown on the left-hand side of the figure) and a second array of light spots (shown on the right-hand side of the figure). The second light pattern 904 is formed in a top-middle region of the scene. The first light pattern 902 is formed from a first hologram 1001 displayed on a first half of a spatial light modulator 1000. The second light pattern 904 is formed from a second hologram 1002 displayed on the second half of the spatial light modulator 1000. The first hologram 1001 forms a first holographic replay field 1014.

The second hologram 1002 forms a second holographic replay field 1004. The first holographic replay field 1014 and second holographic reply field 1004 are projected at substantially the same time or different times (e.g. in sequence one after the other) to form the first and second light patterns 902, 904 shown on scene 900.

The first hologram 1001 is illuminated by first pulsed light from a first laser diode, LD #1. The second hologram 1002 is illuminated by second pulsed light from a second laser diode, LD #2. In accordance with this disclosure, at least one pulse property of the first pulsed light of the first laser diode, LD #1, is different to that of the second pulsed light of second laser diode, LD #2. In this example, the pulse repetition rate of the first laser diode, LD #1, is greater than that of the second laser diode, LD #2. In other words, the time duration 1008 between light pulses of the first laser diode, LD #1, is less than the time duration 1006 between light pulses of the second laser diode, LD #2. In this example, the peak power, P1, of the light of the first laser diode, LD #1, is also greater than the peak power, P2, of the light of the second laser diode, LD #2.

For the avoidance of doubt, the first step of displaying a first hologram of a first light pattern on a first array of light-modulating pixels and illuminating the first hologram with first pulsed light in order to project the first light pattern onto the scene further comprises, at substantially the same time, displaying the second hologram of the second light pattern on the second array of light-modulating pixels and illuminating the second hologram with the first pulsed light in order to co-project the first and second light pattern onto the scene using the first pulsed light.

In a variation, one laser diode illuminates the entire LCOS and pulses with a first frequency. The holograms displayed on the first and second portions of the LCOS distribute light, respectively, to the centre and the edges of the scene. A second laser diode illuminates only the second portion of the LCOS and pulses in between the pulses of the first laser diode. This provides additional pulses to the edges of the scene. In another variation, the holograms on the first and second regions are configured to send light all to other distributions rather than "centre" and "edge".

Features of the third group of embodiments provide the following advantages: avoids wasting time with long repetition frequency for long range at high measurement angles where the range of interest is short; makes efficient use of the LCOS component; helps holographic LiDAR meet requirements for automotive applications; and introduces a degree of freedom in average power distributed to different regions of the scene.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method for performing light detection and ranging, the method comprising:
    displaying a first hologram of a first light pattern on a first array of light-modulating pixels;
    determining at least one parameter associated with projection of the first light pattern;
    illuminating the first hologram with first pulsed light in order to project the first light pattern onto a scene, wherein at least one pulse property of the first pulsed light is based on the at least one parameter associated with the projection of the first light pattern;
    displaying a second hologram of a second light pattern on a second array of light-modulating pixels;
    determining at least one parameter associated with projection of the second light pattern; and
    illuminating the second hologram with second pulsed light in order to project the second light pattern onto the scene, wherein at least one pulse property of the second pulsed light is based on a difference between the at least one parameter associated with projection of the first light pattern and the at least one parameter associated with the projection of the second light pattern, and wherein the at least one pulse property of the first pulsed light is different from that of the at least one pulse property of the second pulsed light.

2. The method for performing light detection and ranging according to claim 1, wherein the second light pattern is projected onto the scene after the first light pattern.

3. The method for performing light detection and ranging according to claim 1, wherein the at least one pulse property comprises one or more of a pulse duration, a peak power, and a repetition rate.

4. The method for performing light detection and ranging according to claim 1, wherein the at least one parameter associated with projection of the first light pattern is a first range and the at least one parameter associated with projection of the second light pattern is a second range.

5. The method for performing light detection and ranging according to claim 1, wherein the at least one parameter associated with projection of the first light pattern is a first measured parameter of a vehicle and the at least one parameter associated with projection of the second light pattern is a second measured parameter of the vehicle, and wherein the first measured parameter is a first speed of the vehicle and the second measured parameter is a second speed of the vehicle.

6. The method for performing light detection and ranging according to claim 5, wherein the vehicle is a vehicle performing the method of light detection and ranging or a vehicle subject to the method of light detection and ranging.

7. The method for performing light detection and ranging according to claim 5, wherein the at least one pulse property comprises one or more of a pulse duration, a peak power, and repetition rate, and wherein the method comprises performing one or more of:

selecting the pulse duration of the second pulsed light to be greater than that of the first pulsed light if the second speed of the vehicle is greater than the first speed of the vehicle, or vice versa;
selecting the peak power of the second pulsed light to be greater than that of the first pulsed light if the second speed of the vehicle is greater than the first speed of the vehicle, or vice versa; and
selecting the repetition rate of the second pulsed light to be greater than that of the first pulsed light if the second speed of the vehicle is less than the first speed of the vehicle, or vice versa.

8. The method for performing light detection and ranging according to claim 5, further comprising:
selecting the second hologram so that size of the second light pattern projected onto the scene in a horizontal direction is less than that of the first light pattern if the second speed of the vehicle is greater than the first speed of the vehicle, or vice versa.

9. The method for performing light detection and ranging according to claim 8, wherein the first light pattern and second light pattern comprise an array of light spots having common periodicity such that the second light pattern comprises fewer light spots in the horizontal direction than the first light pattern.

10. The method for performing light detection and ranging according to claim 2, further comprising:
detecting a first light return corresponding to projection of the first light pattern onto the scene; and
making a measurement associated with the first light return, wherein a magnitude of the difference between the at least one pulse property of the first pulsed light and that of the second pulsed light is determined by the measurement associated with the first light return.

11. The method for performing light detection and ranging according to claim 10, wherein the second light pattern only illuminates a sub-area of an area illuminated by the first light pattern and the at least one pulse property comprises at least one selected from a group comprising: pulse duration, peak power, and repetition rate.

12. The method for performing light detection and ranging according to claim 11, further comprising:
calculating a speed of an object in the sub-area or a change in the speed of an object in the sub-area based on the difference between a time of flight measurement associated with the first light return and a time of flight measurement associated with a second light return detected from the scene in response to projection of the second light pattern onto the scene.

13. The method for performing light detection and ranging according to claim 12, wherein after calculating the speed of the object, the method comprises repeating:
the displaying of the first hologram of the first light pattern on the first array of light-modulating pixels;
the illuminating the first hologram with first pulsed light in order to project the first light pattern onto the scene;
the displaying of the second hologram of the second light pattern on a second array of light-modulating pixels; and
the illuminating the second hologram with second pulsed light in order to project the second light pattern onto the scene, wherein the at least one pulse property of the first pulsed light is different from the at least one pulse property of the second pulsed light.

14. The method for performing light detection and ranging according to claim 12, wherein the second light pattern comprises an array of light spots and the method further comprising reducing a number of light spots of the second light pattern in the sub-area before repeating projection of the second light pattern.

15. The method for performing light detection and ranging according to claim 1, wherein the first light pattern and second light pattern are projected onto the scene at substantially the same time.

16. The method for performing light detection and ranging according to claim 15, where the first array of light-modulating pixels and second array of light-modulating pixels are pixels of a single spatial light modulator.

17. The method for performing light detection and ranging according to claim 15, wherein the first hologram directs the first light pattern to a central region of the scene and the second hologram directs the second light pattern to a peripheral region of the scene.

18. The method for performing light detection and ranging according to claim 17, wherein the at least one pulse property is repetition rate and the repetition rate of the second pulsed light forming the second light pattern is greater than the repetition rate of the first pulsed light forming the first light pattern.

19. The method for performing light detection and ranging according to claim 2, wherein displaying the first hologram of the first light pattern on the first array of light-modulating pixels and illuminating the first hologram with first pulsed light in order to project the first light pattern onto the scene further comprises, at substantially the same time, displaying the second hologram of the second light pattern on the second array of light-modulating pixels and illuminating the second hologram with the first pulsed light in order to co-project the first light pattern and the second light pattern onto the scene using the first pulsed light.

20. A method for performing light detection and ranging according to claim 1, wherein each light pattern is a structured light pattern comprising a plurality (e.g. array) of light spots and each light return is detected by an array detector comprising a plurality of individual detection elements.

* * * * *